July 28, 1925.
J. WALDHEIM
1,547,630
TYPEWRITING MACHINE
Filed July 27, 1921  3 Sheets-Sheet 1
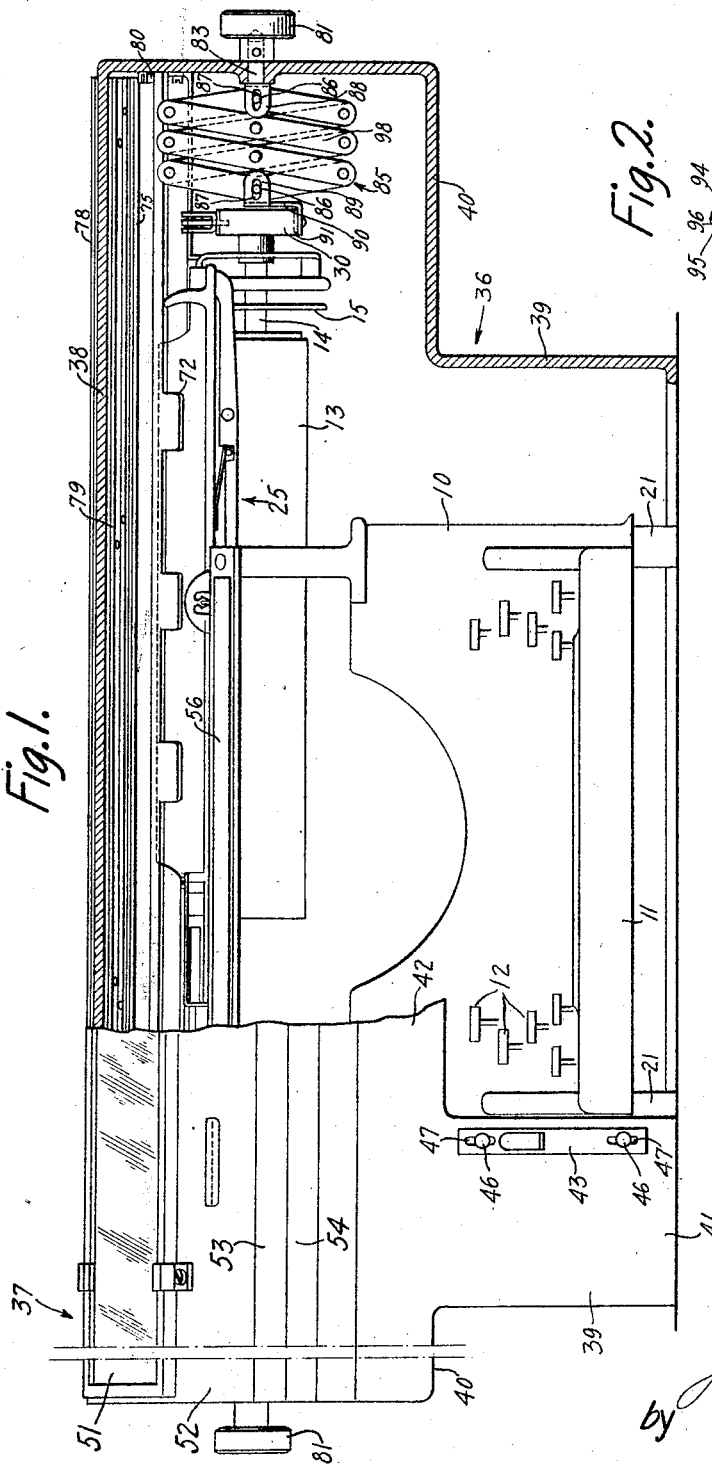
Inventor:
John Waldheim
by JC Stickney
Attorney

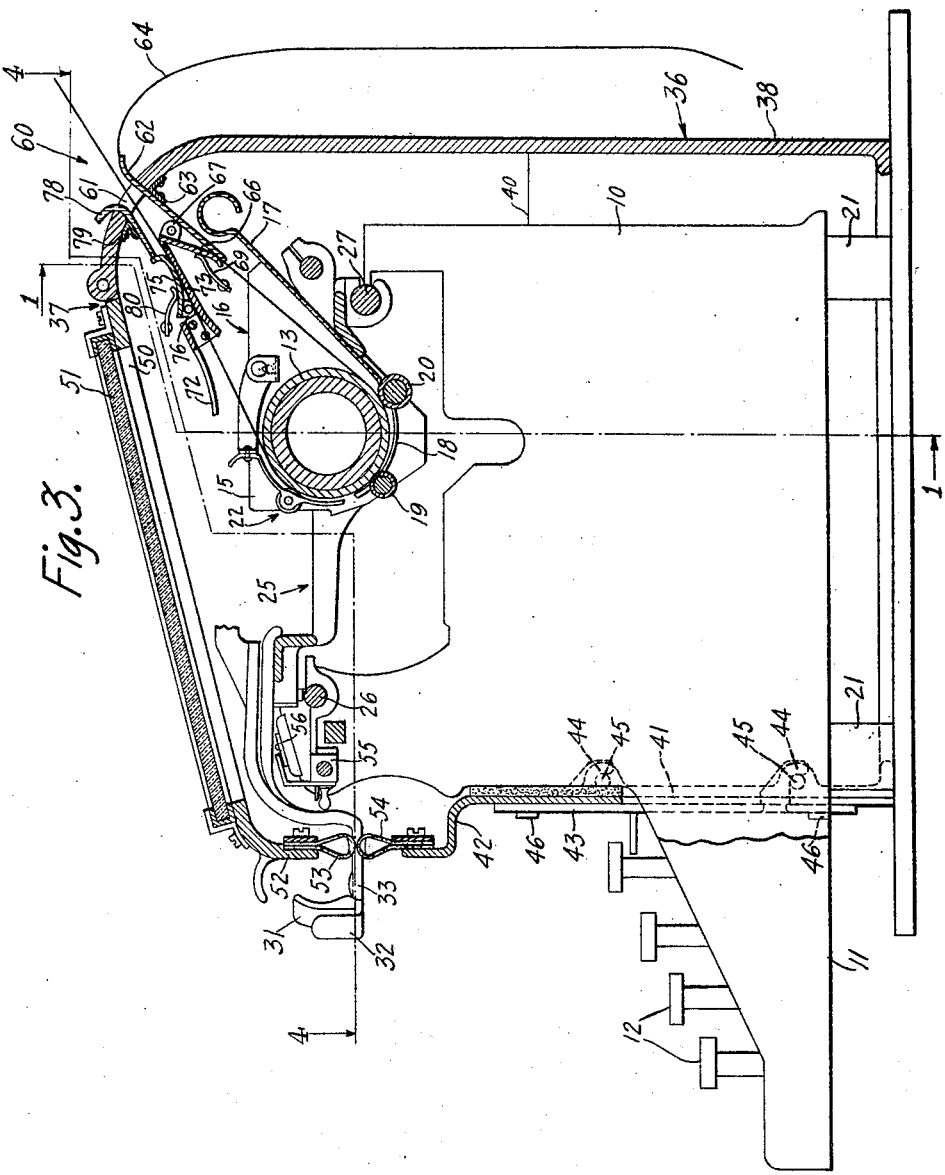

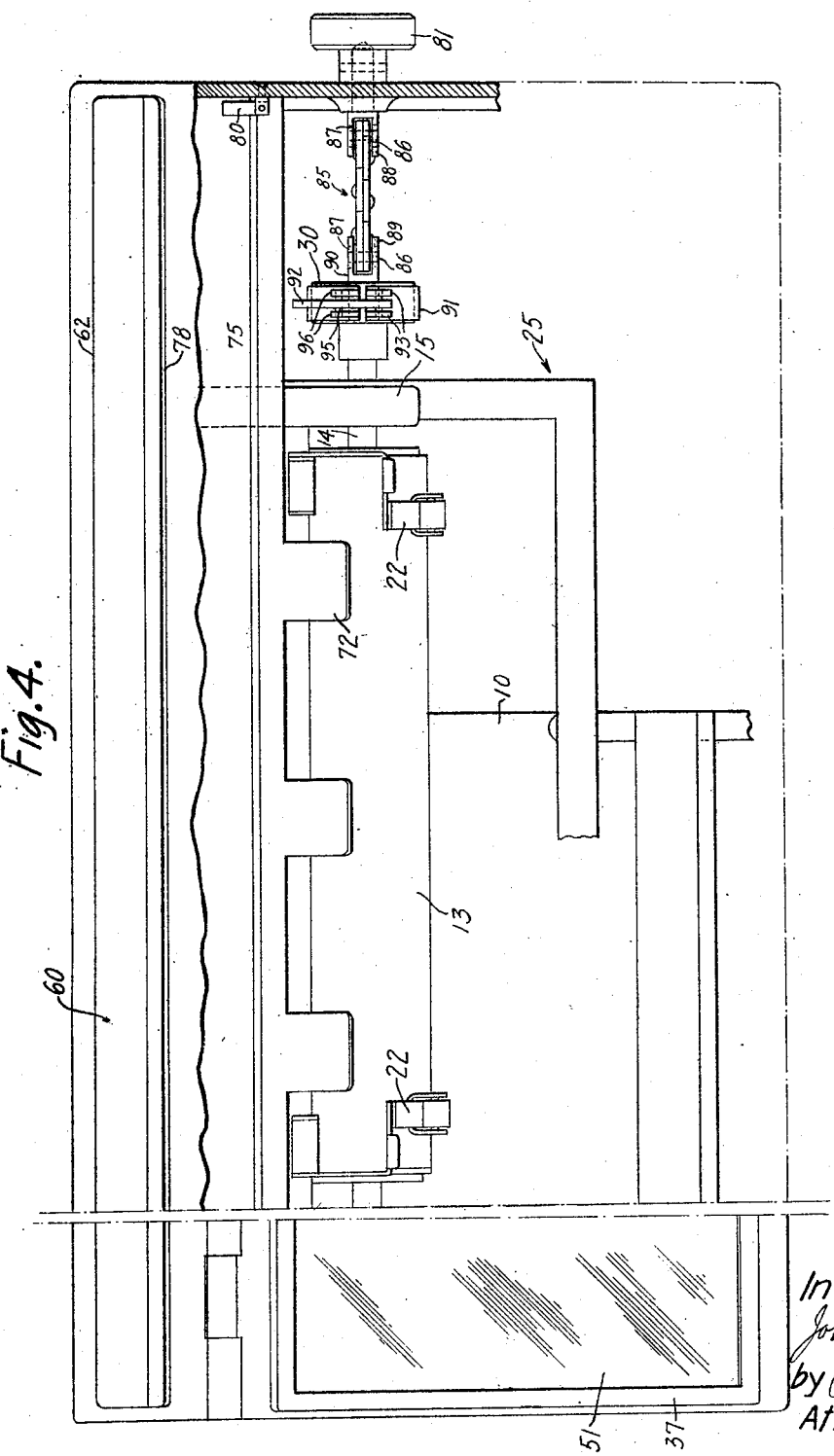

Patented July 28, 1925.

1,547,630

UNITED STATES PATENT OFFICE.

JOHN WALDHEIM, OF ELIZABETH, NEW JERSEY, ASSIGNOR TO UNDERWOOD TYPE-WRITER COMPANY, OF NEW YORK, N. Y., A CORPORATION OF DELAWARE.

TYPEWRITING MACHINE.

Application filed July 27, 1921. Serial No. 487,860.

*To all whom it may concern:*

Be it known that I, JOHN WALDHEIM, a citizen of the United States, residing in Elizabeth, in the county of Union and State of New Jersey, have invented certain new and useful Improvements in Typewriting Machines, of which the following is a specification.

This invention relates to sound-deadening hoods or casings of the type disclosed in my pending application, Serial No. 466,820, filed May 4, 1921, Patent No. 1,519,645, dated December 16, 1924.

The novel casing comprises a body part and a cover part or ceiling, the latter hinged at its rear to said body part, said body part being provided with a large front opening through which the machine may be inserted backwardly into the casing. Banks of type-keys project forwardly from said casing after the machine has been inserted, and a front plate closes the front opening. An edge of the cover part forms, with an edge of the body part, a slot at the front, through which the various carriage-operating levers, such as the line-space lever, the carriage-return finger-piece, and the carriage-release lever, extend. Sound-deadening means in the form of co-operating strips or cushions on the body part and cover part are provided for closing all of the slot not actually occupied by the carriage-operating levers.

It is a feature of this invention to provide means permitting the insertion into, and withdrawal from, the machine of work-sheets, without removing the casing or opening the cover part, and without forming an outlet to the exterior of the casing, through which sounds may pass. For this purpose, there is provided, in the rear wall of the casing above the typewriter carriage, a slot in which is positioned a chute for guiding work-sheets to the platen and for guiding said sheets to the outside of the casing after passing around said platen, said chute comprising members which are so positioned relatively to each other as to close any outlet or passage for sounds through said slot to the exterior of the casing.

The casing remaining closed during the insertion of the sheet, means is provided whereby the platen may be rotated freely in either direction from the outside of the casing to facilitate the insertion and withdrawal of the work-sheets without opening of the casing. For this purpose, there are provided, on the outside of the casing, knobs or finger-wheels journaled upon shafts extending through the casing, and means for connecting the inner ends of said shafts with the usual knobs or finger-wheels fixed on the platen shaft or axle, so that, by rotating the finger-wheels upon the outside of the casing, the platen will be rotated correspondingly. Since the platen travels to the right and left, and, therefore, the distance from the finger-wheels fixed upon the platen-shaft to the side walls of the casing varies, the connecting means between the inner and outer finger-wheels may comprise a variable-length linkage preferably in the form of lazy-tongs, which can readily adjust itself to the varying positions of the platen within the casing, the platen being both movable longitudinally and shiftable up and down to enable different types to print.

Other features and advantages will hereinafter appear.

In the accompanying drawings,

Figure 1 is a front view, partly sectioned along the line 1—1 of Figure 3, of the sound-deadening casing or hood applied to an Underwood standard typewriting machine.

Figure 2 is a detail of the means for connecting the lazy-tongs to the finger-wheels on the ends of the platen-shaft.

Figure 3 is a side view, vertically sectioned, of the device shown in Figure 1.

Figure 4 is a plan view, partly sectioned along the line 4—4 of Figure 3, of the device shown in Figure 1.

The Underwood standard typewriting machine comprises a main frame 10, supported upon feet 21, and a forward extension 11 of said main frame in which are positioned banks of keys 12, which operate type-bars (not shown), to cause types carried by said type-bars to print against a platen 13, fixed upon a shaft 14, journaled in the end walls 15 of a platen-frame 16. Said platen-frame is provided with a rear paper-table 17, which terminates beneath the platen in a paper-apron 18, having openings through which project front and rear feed-rolls 19 and 20 to co-operate with the under side of the platen, paper-fingers 22 being mounted in said platen-frame and co-operating with the forward upper surface of the platen. The platen-frame forms part of a carriage 25, mounted for letter-feeding movement on a front rail 26 and a rear rail 27 on the main frame of the machine. The platen is rotatable in either direction by knobs or finger-wheels 30, fixed on the ends of the platen-shaft 14, and in line-spacing direction by a line-space handle 31 extending forwardly from said carriage and forming part of the line-spacing mechanism, said carriage being provided with additional forwardly-extending levers or finger-pieces, such as the carriage-return finger-piece 32 and carriage-release lever 33.

For deadening the sounds arising in the typing operation, there is provided a sound-deadening casing or hood comprising a body part 36 and a cover part or ceiling 37 hinged to said body part. Said body part comprises a rear wall 38, side walls 39 provided with upper, lateral extensions 40 over which the typewriter carriage may operate to the right and left, and a front wall in the form of two end portions 41, said end portions being spaced apart to provide a large opening through which the machine may be inserted into the casing. When the machine has been inserted into the casing, the extension 11 projects forwardly from said casing, and to close all of the front opening not occupied by said extension 11, there is provided a front plate 42, said front plate 42 being mounted upon the end portions 41 by means of slides 43, having hooks 44 passing through said front plate and engaging pins 45 fixed to said end portions, said slides being movable upwardly on said front plate on studs 46 passing through slots 47 in the slides, to disengage said hooks from said pins. The machine is thus enclosed at the rear, sides, and front; and to enclose the machine at the top, there is provided the cover part or ceiling 37 comprising a cut-out portion 50, which is occupied by a transparent plate 51 permitting the machine within the casing to be viewed, said cover part terminating in a short front wall 52 some distance above the top of front plate 42. There is thus provided a slot at the front through which the various carriage-operating levers, such as the line-space handle 31, carriage-return finger-piece 32, and carriage-release lever 33, extend. To close all of the slot not actually occupied by these carriage-operating levers, there are provided co-operating strips or cushions 53 and 54, the two-ply edges of said cushions being clamped against the front wall of the cover part and against the front plate 42, so that the cushions contact to close the slot. The lower cushion terminates slightly below the margin-stops 55, which co-operate with the usual scale 56 on the machine frame, so that, when the cover part is raised, there will be uninterrupted access to said stops.

It will thus be apparent that the ordinary typing operations can be carried on without removing the casing or raising the cover part, due to the exposed position of the banks of keys 12 and the operating levers 31, 32, and 33. It is desirable to provide also means whereby the work-sheets may be inserted in the machine, and withdrawn therefrom, without removing the casing or raising the cover part. For this purpose, there is provided a chute, indicated generally by the numeral 60, said chute being fitted into a lateral slot 61 in the rear wall 38 of the body part of the casing, said slot being positioned to the rear and above said platen. The chute 60 comprises a lower shelf 62 attached to the lower edge of the slot 61, preferably by a bracket 63, said shelf extending between the side walls of the body part and being designed to direct a work-sheet, such as 64, downwardly to the bite formed by the platen and the rear feed-rolls 20. A closure or plate 66 may be pivoted at its rear by ears 67 adjacent the side walls of the body part, the weight of said plate being sufficient to hold it in contact with shelf 62. However, if desired, a spring 69 may be provided to press a light plate 66 down for closing the opening 61. The work-sheet is led forwardly around the platen by rotating the latter, and passes beneath paper-fingers 22, and is deflected by an apron 72 extending between the side walls of the body part, so as to pass over an upper shelf 73, likewise extending between the side walls of the body part. A closure or plate 75 is pivoted by ears 76 at its forward edge on the side walls of the body part, so that the weight of the plate 75 is sufficient to hold it in contact with the upper shelf 73, to close the sheet passage between shelf 73 and a member or guide 78 fixed to the upper edge of the slot 61, preferably by brackets 79, so that the work-sheet passes outside of the casing. Springs 80 may be provided to press against pivoted plate 75, if of light construction, to hold said plate down to close the opening. The member 78 contacts with the rearward edge of closure plate 75. It will be noted, therefore, that the only opening from within the casing to the outside thereof through the chute lies between the lower guiding means (shelf 62) of said chute and the upper guiding means (shelf 73, plate 75, member 78). To close this passage, the plate 66 is so positioned that while its lower edge contacts with the lower shelf 62, its upper rearward edge terminates adjacent the rearward edge of the shelf 73, the plate 66 being positioned, therefore, transversely of the slot between the upper and lower guiding means to close the only passage through said chute to the outside of the casing. Thus a means is provided whereby a work-sheet may be inserted from the exterior of the casing around the platen of the machine and guided rearwardly to the exterior of the casing without providing any outlet through which sounds may be transmitted from the interior to the exterior of the casing. Since the unused portions of the work-sheet, as well as those portions that have been typed, extend outside of the casing, it is not necessary to provide space between the rear wall of the casing and the machine for accommodating said portions of the work-sheets, and the rear wall of said casing may therefore lie close to the rear of the machine.

As hereinbefore described, the platen may be line-spaced from the outside of the casing by the operation of the line-space handle 31. To rotate the platen freely in either direction from the outside of the casing, as, for example, when introducing a work-sheet into the machine, there may be provided knobs or finger-wheels 81, similar to the knobs or finger-wheels 30 fixed to the ends of the platen-shaft 14, said knobs 81 being fixed upon short shafts 83 passing through the side walls of the casing, said shafts 83 having their axes normally in alignment with the axis of shaft 14. In order that finger-wheels 30 shall rotate when finger-wheels 81 are rotated, a connection, indicated generally at 85, is provided between the finger-wheels 30 and 81. Said connection is provided with pins 86, one at each end, operating in co-operating slots 87 of yokes 88 and 89, fixed to the inner end of each shaft 83 and to a bracket 90 fixed upon a split ring 91, respectively. Said split ring is fixed upon finger-wheel 30 by means of a clamp comprising a handle 92, pivoted in brackets 93 on one end of the split ring, said handle having a cam-slot 94 in which operates a pin 95, fixed in brackets 96 on the other end of the split ring, so that downward movement of the handle 92 will cause the pin 95, and hence the brackets 96, to approach the brackets 93 and hence draw the ends of the split ring together to clamp it tightly upon the finger-wheel 30. It is apparent that pins 86 rotate with yokes 88 and 89, so that, upon rotating finger-wheel 81, the connecting member 85 and split ring 91 will be similarly rotated to rotate the finger-wheel 30 upon which said split ring is clamped. The platen may thus be rotated freely in either direction by rotating the finger-wheels upon the outside of the casing.

The platen travels from right to left and return, and hence finger-wheels 30 occupy varying positions with respect to the side walls of the casing. It is, therefore, necessary to provide a connecting member 85 which shall have a variable length, so that it may adjust itself to the varying positions of the platen and finger-wheels 30 within the casing. For this purpose, the connecting member 85 is in the form of lazy-tongs comprising pivoted links 98, said links being movable laterally with respect to each other to vary the distance between the pins 86 in the ends of said lazy-tongs, but said tongs having no rotary movement other than that transmitted thereto by rotating knobs 81 to rotate pins 86. The lazy-tongs will thus transmit all rotary movement from the outer finger-wheels 81 to the inner finger-wheels 30, regardless of the position of the latter within the casing. The loose connections of the lazy-tongs comprising the pins 86 and slots 87 permit free case-shifting movements of the platen when the lazy-tongs are disposed in a substantially horizontal position in their rotation.

Variations may be resorted to within the scope of the invention, and portions of the improvements may be used without others.

Having thus described my invention, I claim:

1. A sound-deadening casing for a typewriting machine having a traveling cylindrical platen, said casing having a slot in the rear of the platen through which a work-sheet may be fed to and from the platen, and including means for restricting the escape of sound through said slot.

2. A sound-deadening casing for a typewriting machine having a traveling cylindrical platen, said casing having a rear slot through which a work-sheet may be fed to and from the platen, and having a chute in said slot having its bottom positioned to direct the work-sheet to the platen, and means for restricting the escape of sound through said slot.

3. A sound-deadening casing for a typewriting machine having a traveling cylindrical platen, said casing having a slot in rear of the platen through which a work-sheet may be fed to the platen, and having a chute in said slot to guide the inserted work-sheet to the platen, and a guide to engage the leading edge of the work-sheet during its delivery from the platen to guide said leading edge into the inner end of said chute.

4. A sound-deadening casing for a typewriting machine having a traveling cylindrical platen, said casing having a slot in rear of the platen through which a work-sheet may be fed to the platen, and having a chute in said slot, a shelf to receive the leading edge of the work-sheet when delivered from the platen, said shelf extending to the chute, and means for preventing the escape of sound through said slot.

5. A sound-deadening casing for a typewriting machine having a revoluble platen, said casing having a slot, and comprising a shelf in said slot for guiding work-sheets fed to said platen from outside of the casing, and a slot-closing plate pivotally mounted at one end and having its other end bearing against said shelf.

6. A sound-deadening casing for a typewriting machine having a revoluble platen, said casing having a slot, and comprising a chute in said slot for guiding work-sheets to said platen from outside of the casing, and means for guiding said work-sheets from the platen to the slot when said sheets leave said platen.

7. A sound-deadening casing for a typewriting machine having a revoluble traveling platen, said casing having a slot in rear of the platen, and a chute in said slot having a lower shelf for guiding work-sheets to the platen and an upper shelf for guiding said work-sheets to the outside of the casing after said sheets have passed around said platen.

8. A sound-deadening casing for a typewriting machine having a revoluble platen, said casing having a slot, a chute in said slot for guiding work-sheets to the platen from outside of the casing and from the platen outside of said casing, said chute having a bottom for guiding the work-sheets to the platen and a top for guiding said work-sheets to the outside of the casing after they have passed around said platen, and chute-closing means on said top and said bottom.

9. A sound-deadening casing for a typewriting machine having a revoluble platen, said casing having a slot, and comprising a chute in said slot, said chute comprising lower guide means for guiding work-sheets from outside of the casing to the platen and upper guide means for guiding the sheets from the platen to the outside of the casing after said sheets have passed around said platen, and means for closing the opening between the upper guide means and the lower guide means to restrict escape of sound therethrough, said closing means permitting the passage of the work-sheets.

10. A sound-deadening casing for a typewriting machine, said machine having a revoluble platen, said casing having a slot, lower guide means mounted on the lower edge of said slot for guiding work-sheets to the platen, upper guide means mounted on the upper edge of said slot for guiding the sheets to the outside of the casing after said sheets have passed around said platen, there being an opening between said lower guide means and upper guide means leading from the interior to the exterior of the casing, and means for closing said opening.

11. The combination with a sound-deadening casing for a typewriting machine having a revoluble platen shiftable up and down, of a platen-turning device journaled in the casing and comprising a finger-wheel outside the casing and, a collapsible portion inside said casing accommodating the up-and-down movements of the platen.

12. The combination with a sound-deadening casing for a typewriting machine having a revoluble, shiftable and letter-spacing platen, of a platen-turning device journaled in the casing and comprising a finger-wheel outside the casing, a flexible portion inside said casing and accommodating the shift movements of the platen, and means at the inner end of said flexible portion to connect it with the platen for turning the same.

13. The combination with a sound-deadening casing for a typewriting machine having a revoluble platen shiftable up and down, of a platen-turning device journaled in the casing and comprising a finger-wheel outside the casing, lazy-tongs connected at the outer end with the outside finger-wheel, and means at the inner end of the lazy-tongs connectible with said finger-wheel for turning the platen in different shift positions thereof.

14. The combination with a sound-deadening casing for a typewriting machine having a revoluble platen shiftable up and down, of a platen-turning device journaled in the casing and comprising a finger-wheel outside the casing, lazy-tongs connected at the outer end with the outside finger-wheel and means at the inner end of the lazy-tongs for connecting the latter with the platen for turning the same in its different shift positions.

15. The combination with a sound-deadening casing for a typewriting machine having a revoluble platen mounted for case-shift movement and a finger-wheel fixed to the platen at one end, of a platen-turning device comprising a stub-shaft journaled in the casing in alignment with the platen axis, a collapsible connection attached to the inner end of said stub-shaft and provided with means for attachment to the typewriter finger-wheel, and a finger-wheel at the outer end of said stub-shaft for turning the latter and consequently the platen, said collapsible connection having a lost-motion connection with said stub-shaft to permit a case-shift movement of the platen when connected with said platen turning device.

16. The combination with a sound-deadening casing for a typewriting machine having a revoluble platen, of a platen-turning device journaled in the casing in alignment with the platen axis and comprising a finger-wheel outside the casing, lazy-tongs connected at the outer end with the outside finger-wheel, and means at the inner end of the lazy-tongs for connecting the latter with the platen for turning the same, said connecting means comprising a lever shiftable in one direction to render the connecting means effective and in the opposite direction to render the connecting means ineffective.

17. A sound-deadening casing for a typewriting machine, said machine having a revoluble platen mounted upon a shaft and finger-wheels fixed to the shaft for rotating the platen, said platen and finger-wheels traveling within said casing and occupying varying positions relative to the sides of the casing, other finger-wheels mounted on the sides of the casing, a split ring mounted upon each of said first finger-wheels, means for clamping said split rings on said first finger-wheels, and lazy-tongs connecting each of said second finger-wheels to one of said split rings, said lazy-tongs comprising members movable laterally to vary the length of the lazy-tongs and to correspond to the varying positions of the first finger-wheels relative to the sides of the casing, said lazy-tongs permitting rotation of said first finger-wheels and platen freely in either direction, and regardless of the position of the platen relative to the sides of the casing, by rotating the finger-wheels on the sides of the casing.

18. A sound-deadening casing for a typewriting machine having a revoluble platen at the top and near the rear thereof, said casing having a narrow sheet-introducing-and-withdrawing slot above and to the rear of the platen, and comprising means for maintaining the slot in closed condition during the letter-feeding movement of a sheet along the slot and the line-feeding movement of the sheet through the slot, and a rear wall close to the typewriting machine, any portion of the work-sheet extending beyond the rear of the machine hanging down at the rear of said rear wall.

19. A sound-deadening casing for a typewriting machine, said machine comprising a platen, said casing having a slot therein, a chute having two passageways to guide a work-sheet into the casing to the platen and out of the casing as the work-sheet leaves the platen, and devices to close the passageways to prevent the emission of sound from said casing.

20. The combination with a typewriting machine having a platen and a finger-wheel to rotate the same, and a sound-deadening casing for said machine, of a finger-wheel on the outside of said casing in substantial alignment with the axis of the platen, and means to connect said last-named finger-wheel with the platen, said means comprising a ring to fit over the finger-wheel on the platen, means to bind the ring tightly on said finger-wheel, and a collapsible connection between the outside finger-wheel and the typewriter finger-wheel.

21. The combination with a sound-deadening casing for a typewriting machine having a revoluble shiftable platen, of a finger-wheel outside of said casing and journaled therein, and means to connect said finger-wheel with the platen to rotate the platen in different shift positions thereof, said means comprising lazy-tongs.

22. The combination with a sound-deadening casing for a typewriting machine having a platen and a finger-wheel to rotate the same, said casing comprising a cover liftable to afford access to said finger-wheel, of a finger-wheel outside of and journaled in said casing, and lazy tongs connecting said last-named finger-wheel with the platen.

23. The combination with a sound-deadening casing for a typewriting machine having a platen and a finger-wheel to rotate the same, of a finger-wheel on the outside of and journaled in said casing substantially in alignment with the axis of the platen, and means to connect the outside finger-wheel with the platen, comprising lazy-tongs connected between the outside finger-wheel and the platen, a ring to fit over the finger-wheel on the platen, and means for binding said ring tightly on the platen finger-wheel, said binding means comprising a lever for controlling the same.

24. The combination with a typewriting machine having a carriage provided with a platen, of a closed sound-subduing casing in which said typewriting machine is fitted, said casing having in rear of the platen a work-sheet slot of a length to accommodate the travel of the carriage, and also having an exterior platen-rotating device connected through the casing with said platen, and operable at all points in the carriage travel, permitting the work-sheet to be presented to and fed around the platen in the closed casing.

25. The combination with a typewriting machine having a carriage provided with a platen, of a closed sound-subduing casing in which said typewriting machine is fitted, said casing having in rear of the platen a work-sheet slot of a length to accommodate the travel of the carriage, and also having an exterior platen-rotating device connected through the casing with said platen, and operable at all points in the carriage travel, permitting the work-sheet to be presented to and fed around the platen in the closed casing, said casing comprising a cover overlying said carriage, said cover hinged to the casing in front of the said sheet-slot and having a transparency through which to view the work-sheet.

JOHN WALDHEIM.

Witnesses:
 CATHERINE A. NEWELL,
 JENNIE P. THORNE.